US008850540B2

(12) United States Patent
Lin et al.

(10) Patent No.: US 8,850,540 B2
(45) Date of Patent: Sep. 30, 2014

(54) METHOD AND DEVICE FOR VERIFYING DYNAMIC PASSWORD

(75) Inventors: Huibao Lin, Shenzhen (CN); Zhijan Qian, Shenzhen (CN); Xusheng Hu, Shenzhen (CN); Ruiqiang Liu, Shenzhen (CN)

(73) Assignee: Tencent Technology (Shenzhen) Company Limited, Shenzhen, Guangdong Province (CN)

( * ) Notice: Subject to any disclaimer, the term of this patent is extended or adjusted under 35 U.S.C. 154(b) by 14 days.

(21) Appl. No.: 13/399,052

(22) Filed: Feb. 17, 2012

(65) Prior Publication Data

US 2012/0151566 A1    Jun. 14, 2012

Related U.S. Application Data

(63) Continuation of application No. PCT/CN2010/075009, filed on Jul. 6, 2010.

(30) Foreign Application Priority Data

Aug. 26, 2009    (CN) .......................... 2009 1 0091621

(51) Int. Cl.
| G06F 7/04 | (2006.01) |
| G06F 15/16 | (2006.01) |
| G06F 17/30 | (2006.01) |
| H04L 29/06 | (2006.01) |
| H04L 9/08 | (2006.01) |
| H04L 9/30 | (2006.01) |

(52) U.S. Cl.
CPC ............ *H04L 9/0841* (2013.01); *H04L 9/0838* (2013.01); *H04L 9/0844* (2013.01); *H04L 9/3013* (2013.01)
USPC ............... 726/7; 713/155; 713/171; 713/176; 713/181; 726/2; 726/6; 705/50; 380/28

(58) Field of Classification Search
CPC ... H04L 9/0841; H04L 9/0838; H04L 9/0844; H04L 9/3013
USPC ............................................................ 726/7
See application file for complete search history.

(56) References Cited

U.S. PATENT DOCUMENTS

| 5,319,735 A | * | 6/1994 | Preuss et al. | .................. 704/205 |
| 5,625,746 A | * | 4/1997 | Lim | .......................... 704/200.1 |

(Continued)

FOREIGN PATENT DOCUMENTS

| CN | 101051908 A | 10/2007 |
| CN | 101304315 A | 11/2008 |

(Continued)

OTHER PUBLICATIONS

International Search Report: mailed Oct. 21, 2010; PCT/CN2010/075009.

(Continued)

*Primary Examiner* — Arvin Eskandarnia
(74) *Attorney, Agent, or Firm* — Ladas & Parry LLP

(57) ABSTRACT

The examples of the present invention provide a method and device for verifying a dynamic password. In the method and device, some algorithm parameters can be exchanged in public by using a DH algorithm, and thus a same key is shared safely between two entities, so as to implement the verification of the dynamic password and further improve the security of identity verification. Moreover, the method and device can be easy to use. Further, by the above technical solution, no message exchange is needed between a mobile device and a verification server, and a user does not need to pay for additional flux, so as to decrease the burden of the user and verification costs.

16 Claims, 4 Drawing Sheets

(56) References Cited

U.S. PATENT DOCUMENTS

| | | |
|---|---|---|
| 2006/0117181 A1 | 6/2006 | Brickell |
| 2006/0149676 A1* | 7/2006 | Sprunk et al. .................. 705/50 |
| 2006/0224892 A1* | 10/2006 | Brown et al. ................. 713/171 |
| 2007/0136581 A1 | 6/2007 | Hoghaug et al. |
| 2009/0150678 A1* | 6/2009 | Li et al. ......................... 713/183 |
| 2011/0314290 A1* | 12/2011 | Fort et al. ..................... 713/176 |

FOREIGN PATENT DOCUMENTS

| | | | |
|---|---|---|---|
| CN | 101500011 | * | 8/2009 |
| CN | 101500011 A | * | 8/2009 |
| CN | 101662465 A | | 3/2010 |
| TW | I253266 B | | 4/2006 |
| TW | 200808000 A | | 2/2008 |

OTHER PUBLICATIONS

Mexico Office Action dated Aug. 5, 2013; Appln. No. MX/A/2012/002367.

Russian Office Action dated Jun. 21, 2013; Appln. No. 2012110323.

Taiwan First Office Action dated Jun. 28, 2013; Appln. No. 099118742.

* cited by examiner

METHOD AND DEVICE FOR VERIFYING DYNAMIC PASSWORD

FIELD OF THE INVENTION

The present invention relates to network communication technologies, and more particularly to a method and device for verifying a dynamic password.

BACKGROUND OF THE INVENTION

At present, password verification is a common technology for verifying network identity, and usually includes static password verification and dynamic password verification. Compared with a static password, a dynamic password is usually used one time only and becomes invalid after being used. And thus, the security of the dynamic password is much higher than that of the static password. The dynamic password may be implemented through hardware or software. The dynamic password implemented through hardware has high security and is easy to use, but has higher costs. Compared with the dynamic password implemented through hardware, the dynamic password implemented through software has lower security and is not easy to use, but has much lower costs. Since a personal mobile device, e.g., a mobile telephone and a Personal Digital Assistant (PDA), can be easy to use and has higher security, most dynamic passwords implemented through software are based on the personal mobile device.

A system for implementing software dynamic password based on a personal mobile device usually includes token software and a verification server. A problem of this kind of system to be solved is how a token seed is shared safely by the token software and the verification server. Herein, the token seed is shared secretly by the token software and the verification server, and can make the token software and the verification server synchronously generate the same dynamic password.

In a conventional method, a user may install token software in a mobile device firstly, then obtains a file containing a token seed and leads the file into the token software. In another method, each token software contains one unique token seed, and the user may directly install and use the token seed after downloading the token software; or the mobile device negotiates with the verification server through a serious of real-time messages to obtain the token seed.

As can be seen from the above conventional technical solutions, the security can not be guaranteed. If a hacker obtains the token software during the procedure of downloading the token software, the hacker can obtain the token seed, and thus the dynamic password generated by using the token seed is meaningless. If the mobile device does not support networking, it is difficult for the mobile device to exchange real-time messages with the verification server. Moreover, when the mobile device exchanges real-time messages with the verification server, the user needs to pay for generated flux, which increases the burden of the user and verification costs.

SUMMARY OF THE INVENTION

Examples of the present invention provide a method and device for verifying a dynamic password. The method and device can improve the security of identity verification and can be easy to use. Moreover, by the method and device, no message exchange is needed between a mobile device and a verification server, and thus a user does not need to pay for additional flux, so as to decrease the burden of the user and verification costs.

An example of the present invention provides a method for verifying a dynamic password, which includes:

generating, by a mobile device, an initial code according to token software, and transmitting the initial code to a verification server through a web page;

generating, by the mobile device, a current dynamic password by using a Diffie-Hellman (DH) algorithm after the initial code passes verification, and transmitting the current dynamic password to the verification server through a web page;

generating, by the verification server, a dynamic password of the verification server according to the received initial code and by using a same Diffie-Hellman algorithm as that used by the mobile device; and comparing, by the verification server, the dynamic password of the verification server with the dynamic password generated by the mobile device, and verifying whether the dynamic password generated by the mobile device is correct.

An example of the present invention provides a device for verifying a dynamic password, which includes:

an initial code generating unit, configured in a mobile device, and configured to generate an initial code according to token software, wherein the initial code is transmitted to a verification server through a web page;

a dynamic password generating unit, configured in the mobile device, and configured to generate a current dynamic password of the mobile device by using a Diffie-Hellman (DH) algorithm after the initial code passes verification, wherein the current dynamic password is transmitted to the verification through a web page; and a dynamic password verifying unit, configured in the verification server, and configured to generate a dynamic password of the verification server according to the received initial code and by using a same DH algorithm as that used by the dynamic password generating unit, compare the dynamic password of the verification server with the dynamic password of the mobile device, and verify whether the dynamic password generated by the dynamic password generating unit is correct.

As can be seen from the above technical solution, the mobile device generates the initial code by using the token software and transmits the initial code to the verification server through a web page; when the initial code passes verification, the mobile device generates the current dynamic password by using a Diffie-Hellman (DH) algorithm, and transmits the current dynamic password to the verification server through a web page; the verification server generates the dynamic password of the verification server according to the received initial code and by using the same DH algorithm as that used by the mobile device; the verification server compares the dynamic password generated by the verification server with the dynamic password transmitted by the mobile device, to verify whether the dynamic password generated by the mobile device is correct. The above technical solution can improve the security of identity verification and can be easy to use. Moreover, by the above technical solution, no message exchange is needed between the mobile device and the verification server, and the user does not need to pay for additional flux, so as to decrease the burden of the user and verification costs.

DETAILED DESCRIPTION OF THE INVENTION

Examples of the present invention provide a method and device for verifying a dynamic password. In the method and device, some algorithm parameters can be exchanged in public by using a DH algorithm, and thus a same key is shared safely between two entities, so as to implement the verification of the dynamic password and further improve the security of identity verification. Moreover, the method and device can be easy to use. Further, by the above technical solution, no message exchange is needed between a mobile device and a verification server, and a user does not need to pay for additional flux, so as to decrease the burden of the user and verification costs.

Figure 1:
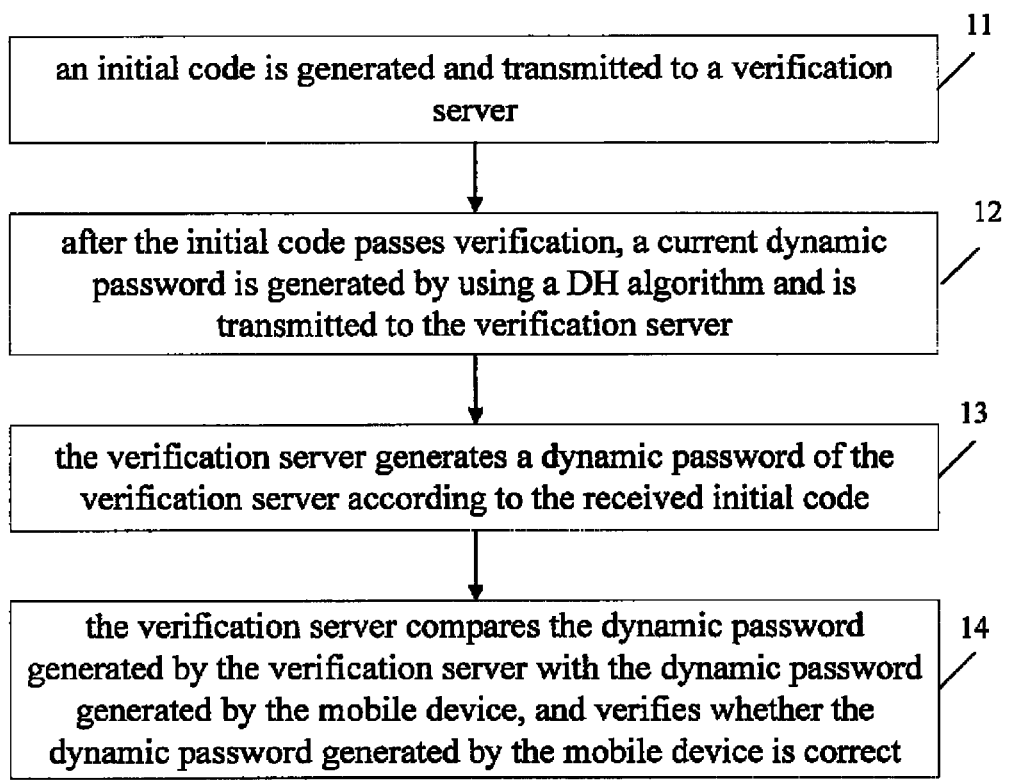
FIG. 1 is a flowchart illustrating a method for verifying a dynamic password according to a first example of the present invention.

In order to describe the examples of the present invention clearer, the examples of the present invention are described with reference to the accompanying drawings. FIG. 1 is a flowchart illustrating a method for verifying a dynamic password according to a first example of the present invention. As shown in FIG. 1, the method includes the following steps.

Step 11: an initial code is generated and transmitted to a verification server.

In this step, a mobile device generates the initial code by using downloaded token software, and transmits the initial code to the verification server through a web page.

The initial code generated by the mobile device by using the token software is composed of a string of numerals and letters, a string of numerals or a string of letters. Specifically, the initial code may be a DH public key generated by the mobile device, and the DH public key may be obtained through a following mode: the mobile device generates a DH private key by using the token software firstly, and then generates the DH public key according to the DH private key and by using a DH algorithm.

In addition, the initial code may further include version number information, where the version number information refers to a version number which is hard encoded in the mobile device in an initialization procedure.

In a specific example, the initial code may be represented with a multi-band code. For example, the initial code is represented with a 32-band code. In this way, characters of the initial code to be inputted may be decreased, so as to be easy to input the initial code through a web page.

Step 12: after the initial code passes verification, a current dynamic password is generated by using a DH algorithm and is transmitted to the verification server.

In this step, after the initial code passes verification, the mobile device generates the current dynamic password by using the DH algorithm and transmits the current dynamic password to the verification server through a web page.

In a specific example, the procedure of verifying the initial code includes that, the verification server performs preset algorithm processing for the received initial code and generates an ACK code; the mobile device obtains the ACK code generated by the verification server, and generates an ACK code of the mobile device according to the initial code and by using a same algorithm as that used by the verification server; the mobile device compares the ACK code generated by the mobile device with the ACK code generated by the verification server, and verifies whether the initial code inputted by the mobile device is correct. For example, if the ACK code generated by the mobile device is the same as the ACK code generated by the verification server, the initial code inputted by the mobile device is correct; otherwise, the initial code inputted by the mobile device is incorrect. The above preset algorithm processing may be a algorithm strategy predefined by an operator, e.g., the former four bits of the initial code may be defined as the ACK code, or the last two bits of the initial code may be defined as the ACK code.

In addition, in the procedure of generating the ACK code by the verification server, the verification server may generate a random numeral sting, performs preset algorithm processing for the generated random numeral string and the received initial code to generate a check code, and generate the ACK code by combining the check code and the generated random numeral string. In this way, the procedure of verifying the initial code is more security.

Or, in the procedure of generating the ACK code by the verification server, the verification server generates a random DH private key, generates a DH public key according to the DH private key and by using a DH algorithm, performs preset algorithm processing for the DH public key and the received initial code to obtain a check code, and generates the ACK code by combining the check code and the DH public key. In this way, the procedure of verifying the initial code is more security.

In a specific example, the mobile device makes token software and the verification server obtain a same token seed during an initialization procedure, and stores the token seed. In the procedure of generating the dynamic password, the mobile device generates the dynamic password by using the token seed and current time. Specifically, the procedure of generating the dynamic password by the mobile device by using the DH algorithm includes that, the mobile device generates a DH key according to the DH private key of the mobile and by using the DH algorithm, generate the token seed according to the DH key and by using a Hash algorithm, and store the token seed; the mobile device performs preset algorithm processing for the token seed and the current time and generates the current dynamic password. Similarly, the preset algorithm processing may be an algorithm strategy predefined by an operator. For example, the mobile device performs Hash algorithm processing for the token seed and the current time, and takes specific values from a Hash result, so as to obtain the dynamic password.

Step 13: the verification server generates a dynamic password of the verification server according to the received initial code.

In this step, the verification server may generate the dynamic password of the verification server according to the received initial code and by using the same DH algorithm as that used by the mobile device.

In a specific example, the procedure of generating the dynamic password of the verification server includes that, the verification server obtains the DH public key of the mobile device by parsing the received initial code, generates the DU key of the mobile device according to the obtained DH public key, generates the token seed according to the obtained DH key and by using the same algorithm as that used by the mobile device, and store the token seed. In the procedure of generating the dynamic password every time, the verification server generates the dynamic password of the verification server by using the stored token seed and using the same algorithm as that used by the mobile device.

Step 14, the verification server compares the dynamic password generated by the verification server with the dynamic password generated by the mobile device, and verifies whether the dynamic password generated by the mobile device is correct.

In this step, the verification server compares the dynamic password generated by the verification server with the dynamic password generated by the mobile device, and verifies whether the dynamic password generated by the mobile device is correct. In a specific example, since there may be a little difference between the time displayed by the mobile device and the time provided by the verification server, it can be preset that the dynamic password generated by the mobile device is correct if the dynamic password generated by the verification server is the same as the dynamic password generated by the mobile device in a predefined time difference, so as to improve the reliability of verification.

In a specific example, the verification server may further generate challenge strategies according to different representations of dynamic password generated by the mobile device, so as to further improve the security of the dynamic password. Specifically, when the mobile device generates, by using the DH algorithm, the current dynamic password represented with a string of numerals, the verification server generates a challenge strategy, and prompts the mobile device to input specific numerals of the current dynamic password. The mobile device transmits the specific numerals to the verification server through a web page according the challenge strategy. The verification server verifies, according to the challenge strategy, whether the dynamic password generated by the mobile device is correct.

Except the above representations, when the mobile device generates, by using the DH algorithm, the current dynamic password represented with multiple strings of numerals, the verification server generates a challenge strategy, and prompts the mobile device to input a certain string of numerals of the current dynamic password. The mobile device transmits the string of numerals of the current dynamic password to the verification server through a web page according the challenge strategy. The verification server verifies, according to the challenge strategy, whether the dynamic password generated by the mobile device is correct.

Except the above representations, when the mobile device generates, by the DH algorithm, the current dynamic password represented with a numeral matrix, the verification server generates a challenge strategy, and prompts the mobile device to input a numeral string corresponding to a certain matrix coordinate of the current dynamic password. The mobile device transmits the numeral string corresponding to the matrix coordinate of the current dynamic password to the verification server through a web page according the challenge strategy. The verification server verifies, according to the challenge strategy, whether the dynamic password generated by the mobile device is correct.

The technical solution provided by the first example can improve the security of identity verification, and the method can be easy to use. Moreover, by the above technical solution, no message exchange is needed between the mobile device and the verification server, and a user does not need to pay for additional flux, so as to decrease the burden of the user and verification costs.

Figure 2:
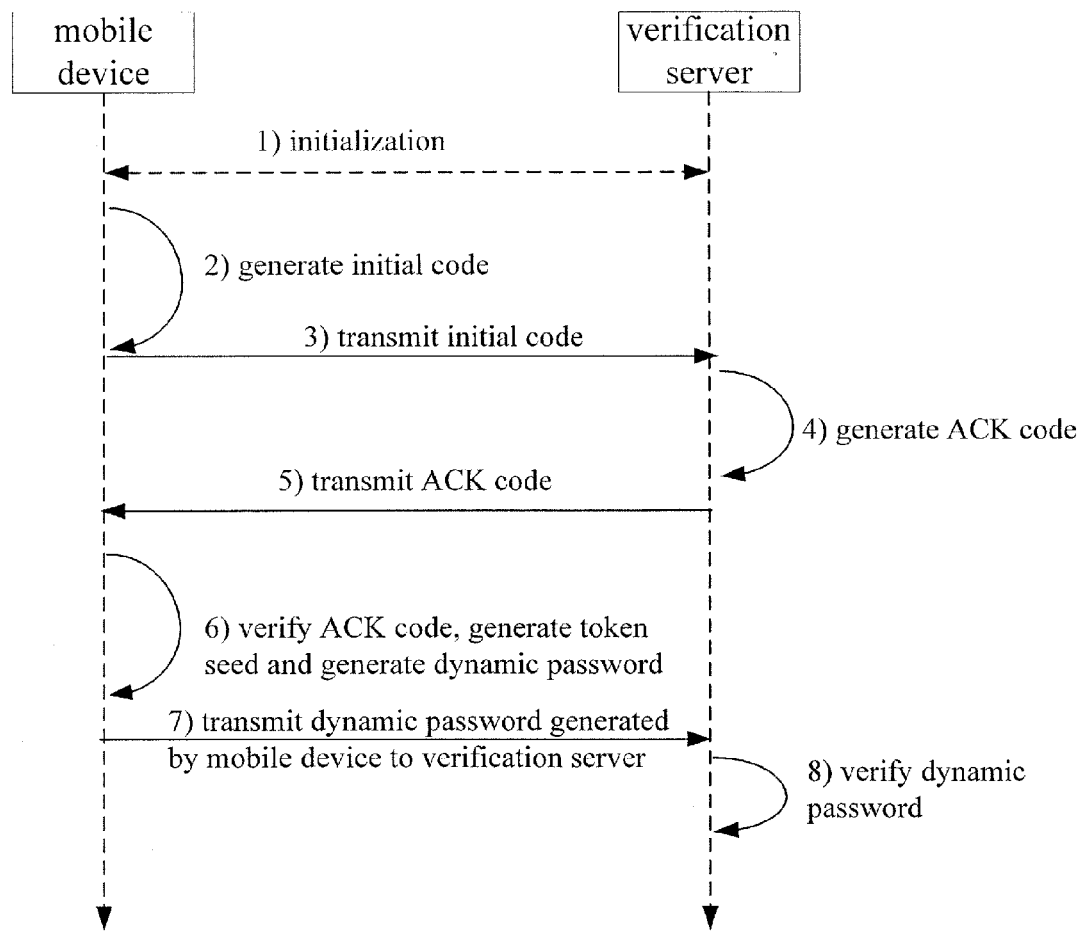
FIG. 2 is a schematic diagram illustrating signaling interaction for verifying a dynamic password between a mobile device and a verification server according to the first example.

FIG. 2 is a schematic diagram illustrating signaling interaction for verifying the dynamic password between the mobile device and the verification server according to the first example. The signaling interaction as shown in FIG. 2 includes the following steps.

Step 1): an initialization procedure

The verification server determines a Diffie-Hellman global public constant, randomly selects a Diffie-Hellman private key of the verification server, generates a Diffie-Hellman public key of the verification server according to the Diffie-Hellman private key, and hard encodes the Diffie-Hellman global public constant and the Diffie-Hellman public key of the verification server into the mobile device. In order to be convenient for management, a version number is provided to the Diffie-Hellman public key of the verification server through hard encoding in the mobile device.

Step 2): the mobile device generates an initial code. When performing an initialization operation, the mobile device generates the initial code represented with a string of numerals and letters. The initial code is represented as follows:

the initial code=the version number+the Diffie-Hellman public key of the mobile device, which is represented with a 32-band code The version number refers to a version number which is hard encoded into the mobile device in the initialization procedure. The Diffie-Hellman public key of the mobile device is obtained through a following mode: generating the Diffie-Hellman private key of the mobile device by using a DH algorithm and generating the Diffie-Hellman public key according to the Diffie-Hellman private key.

In the initialization procedure of step 1), the verification server may not generate the private key and public key of the verification server in advance, may also not hard encode the public key of the verification server into the mobile device, and cancels the version number obtained through hard encoding. At this time, the initial code generated by the mobile device may be represented as follows:

the initial code=Diffie-Hellman public key of the mobile device, which is represented with a 32-band code.

After the above initial code generated, the initial code may be represented with a 32-band code, so as to be convenient for a user to input the initial code through a web page. For example, if 32-band representation is as shown in Table 1,

TABLE 1

| value | represent |
|-------|-----------|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | A |
| 11 | B |
| 12 | C |
| 13 | D |
| 14 | E |
| 15 | F |
| 16 | G |
| 17 | H |
| 18 | Y |

TABLE 1-continued

| value | represent |
|---|---|
| 19 | J |
| 20 | K |
| 21 | L |
| 22 | M |
| 23 | N |
| 24 | X |
| 25 | P |
| 26 | Q |
| 27 | R |
| 28 | S |
| 29 | T |
| 30 | U |
| 31 | V | the initial code may be represented with a 32-band code as follows: (14803)10=(39D3)16=(EEJ)32.

Of cause, the initial code may be represented with an n-band code, where n is an integer larger than 32, so as to decrease characters of the initial code to be inputted and further be convenient for operation.

Step 3): the mobile device transmits the generated initial code to the verification server through a web page. In a specific example, the initial code may be inputted by a user, and may also be inputted by a designated device according to a strategy.

Step 4): in order to verify whether the received initial code is correct, the verification server generates an ACK code, and display the ACK code on the mobile device. The ACK code may be represented as follows:

the ACK code=algorithm processing (initial code).

Specifically, preset algorithm processing is performed for the initial code inputted by the user to obtain a short numeral string. Herein, the preset algorithm processing may be an algorithm strategy predefined by an operator. For example, the former four bits of the initial code may be defined as the ACK code, or the last two bits of the initial code may be defined as the ACK code. In order to be easy to input the ACK code, the ACK code is usually defined as a numeral string of four bits.

In order to improve security, the procedure of generating the ACK code may be improved. Specifically, the ACK code may be defined as:

the ACK code=a random numeral string of the verification server+a check code, and the check code=algorithm processing (the initial code inputted by the user+the random numeral string of the verification server).

The random numeral string of the verification server is a numeral string having more than 6 bits, and is used to increase the security of generating a token seed. The check code is used to verify the correctness of the initial code inputted by the user and the random numeral string of the verification server, and is usually a numeral string having 2 to 4 bits.

Or, the ACK code may be defined as:

the ACK code=the Diffie-Hellman public key of the verification server+the check code, which is represented with a 32-band code, and the check code=algorithm processing (the initial code inputted by the user+the Diffie-Hellman public key of the verification server).

The Diffie-Hellman public key of the verification server is obtained by a following mode: the verification server generates a random Diffie-Hellman private key, and then generates the Diffie-Hellman public key by using a Diffie-Hellman algorithm.

Also, the check code is used to verify the correctness of the initial code inputted by the user and the random numeral string of the verification server, and is usually a numeral string having 2 to 4 bits.

Step 5): the generated ACK code is transmitted to the mobile device.

Step 6): the ACK code is verified and a dynamic password is generated.

Specifically, the mobile device obtains the ACK code generated by the verification server, generates an ACK code if the mobile device according to the initial code and by using the same DH algorithm as that used by the verification server, and compares the ACK code generated by the mobile device with the ACK code generated by the verification server. If the AKC code generated by the mobile device is not the same as the ACK code generated by the verification server, the ACK code dose not pass verification, it is prompted that the inputted initial code is incorrect, and the procedure is terminated. If the AKC code generated by the mobile device is the same as the ACK code generated by the verification server, the ACK code passes verification, and the mobile device may generate the token seed by using the Diffie-Hellman algorithm and generates the current dynamic password.

Specifically, the procedure of generating the dynamic password is as follows:

The DH key of the mobile device is generated firstly. Specifically, the Diffie-Hellman key=Diffie-Hellman algorithm (the Diffie-Hellman private key of the mobile device+the Diffie-Hellman public key of the verification server which has been hard encoded in advance). That is to say, the Diffie-Hellman key is obtained by performing processing for the Diffie-Hellman private key of the mobile device and the Diffie-Hellman public key of the verification server which has been hard encoded in advance according to the Diffie-Hellman algorithm. In other words, the Diffie-Hellman private key of the mobile device and the Diffie-Hellman public key of the verification server which has been hard encoded in advance are taken as two input values, and are calculated by using the Diffie-Hellman algorithm to obtain the Diffie-Hellman key.

And then, the token seed=a Flash algorithm (the Diffie-Hellman key). That is to say, the token seed is obtained by performing processing for the Diffie-Hellman key according to the Hash algorithm.

The above Hash algorithm may be a standard Hash algorithm, e.g., MD5 and SHA256.

If the verification server generates a random numeral string in step 4), the mobile device first verifies the check code to guarantee that the initial code and the random numeral string of the verification server exchanged between the mobile device and the verification server are correct. After the check code passes verification, the algorithm of generating the token seed is modified as follows.

The token seed=the Hash algorithm (the Diffie-Hellman key+the random numeral string of the verification server). That is to say, the token seed is obtained by performing processing for the Diffie-Hellman key and the random numeral string of the verification server according to the Hash algorithm.

If the verification server generates a DH public key of the verification server in step 4), the mobile device first verifies the check code to guarantee that the initial code and the Diffie-Hellman public key of the verification server exchanged between the mobile device and the verification server are correct. After the check code passes verification, the algorithm of generating the token seed is modified as follows.

The Diffie-Hellman key=Diffie-Hellman algorithm (the Diffie-Hellman private key of the mobile device+the Diffie-Hellman public key of the verification server). That is to say, the Diffie-Hellman key is obtained by performing processing for a character string combined with the Diffie-Hellman private key of the mobile device and the Diffie-Hellman public key of the verification server according to the Diffie-Hellman algorithm.

The token seed=Hash algorithm (the Diffie-Hellman key).

After the token seed is obtained by using any one of the above modes, the dynamic password of the mobile device may be generated. The dynamic password may be a numeral string having 6 to 8 bits.

Specifically, the dynamic password=algorithm processing (the token seed+current time). That is to say, the token seed is obtained by performing algorithm processing for the token seed and the current time.

Specifically, preset algorithm processing may be performed for the token seed and the current time, to obtain a numeral string. The preset algorithm processing may be an algorithm strategy predefined by an operator. For example, Hash algorithm processing is performed for the token seed and the current time, and the dynamic password is obtained by taking specific values from the Hash result.

Step 7): the dynamic password generated by the mobile device is transmitted to the verification server through a web page.

Step 8): the verification server verifies whether the dynamic password is correct.

The verification server obtains the DH public key of the mobile device by parsing the received initial code, and generates the Diffie-Hellman key which is the same as the Diffie-Hellman key generated by the mobile device in step 6). After generating the Diffie-Hellman key, the verification server generates the token seed and the dynamic password of the verification server by using the same DH algorithm as that used by the mobile device in step 6), and compares the dynamic password of the verification server with the dynamic password generated by the mobile device, and verifies whether the dynamic password generated by the mobile device is correct.

Since there may be a little difference between the time displayed by the mobile device and the time provided by the verification server, it can be preset that the dynamic password generated by the mobile device is correct if the dynamic password generated by the verification server is the same as the dynamic password generated by the mobile device in a predefined time difference. The time difference may be defined as 1-2 minutes, which can be defined by an operator.

In addition, in the first example, the verification server may generate challenge strategies according to different representations of the dynamic password generated by the mobile device, so as to further improve the security of dynamic password.

Figure 3:
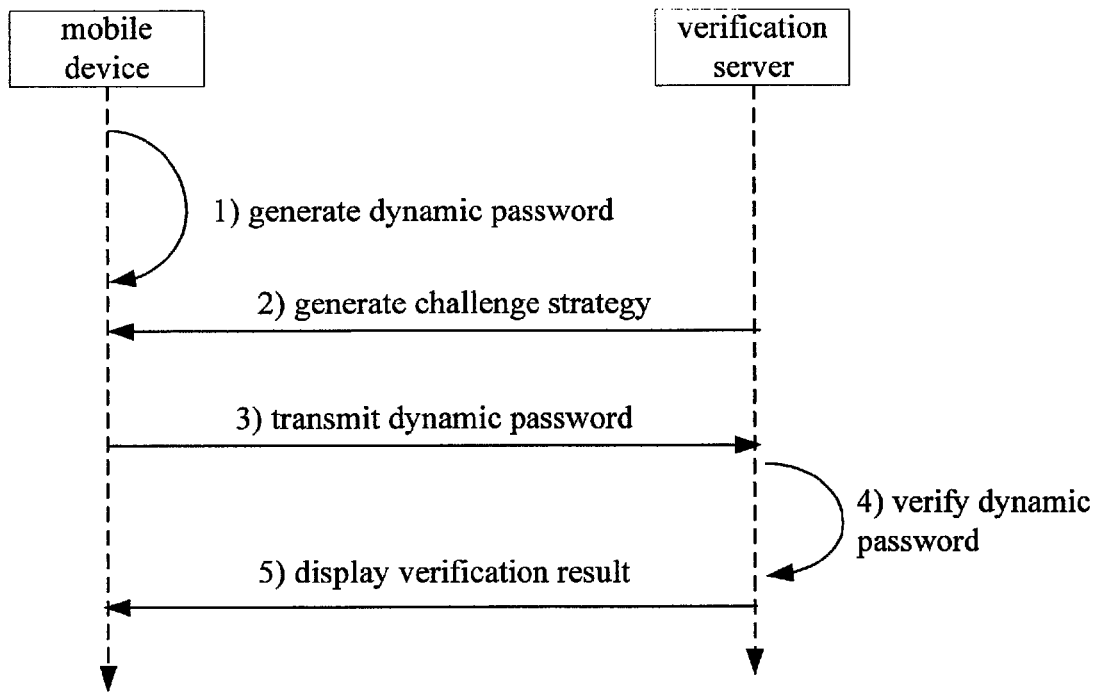
FIG. 3 is a schematic diagram illustrating signaling interaction between a mobile device and a verification server when the verification server generates a challenge strategy according to a specific example.

FIG. 3 is a schematic diagram illustrating signaling interaction between a mobile device and a verification server when the verification server generates a challenge strategy according to a specific example. As shown in FIG. 3, the signaling interaction includes the following steps.

A first step, the mobile device generates a dynamic password. The dynamic password usually has 6 bits of numerals, e.g., 528639.

A second step, the verification server generates a challenge strategy, and prompts a user to input some numerals displayed by the mobile device. For example, if the mobile device displays 528639, the verification server generates a challenge problem "please input the 1st, 3rd, 5th and 6th numerals. The verification is not successful unless the user inputs "5839".

A third step, the user inputs the dynamic password according to the prompt of the verification server.

A fourth step, the verification server verifies whether the dynamic password inputted by the user is correct according to the challenge strategy and by using the method provided by the first example.

a fifth step, a verification result is displayed.

Figure 4:
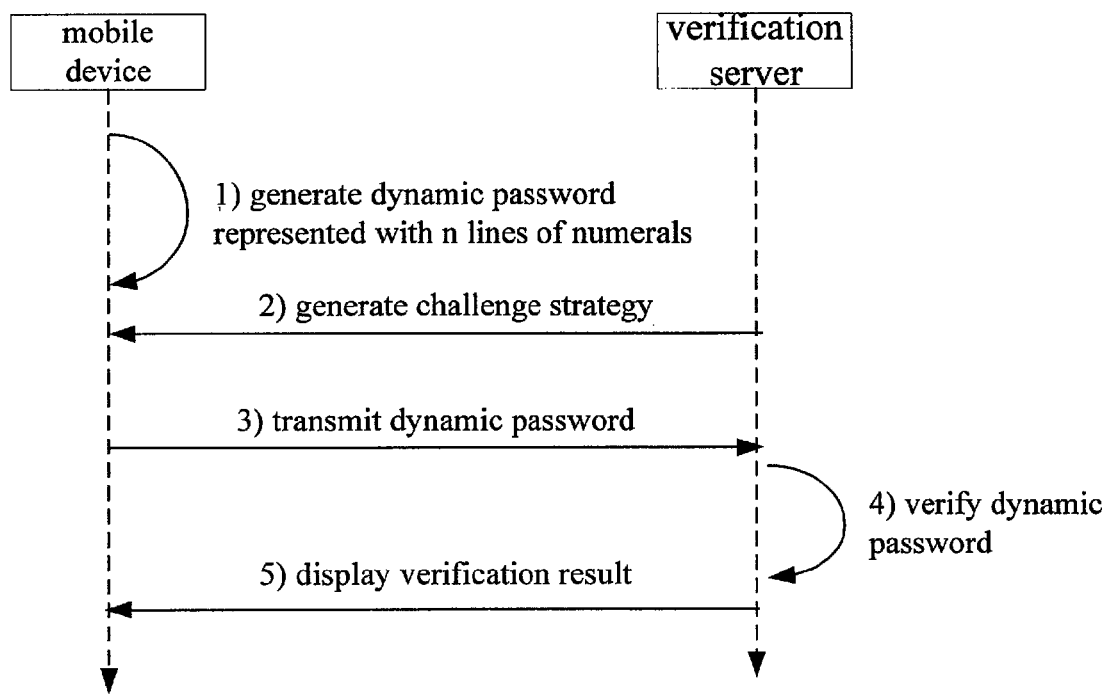
FIG. 4 is a schematic diagram illustrating signaling interaction between a mobile device and a verification server when the verification server generates a challenge strategy according to another specific example.

FIG. 4 is a schematic diagram illustrating signaling interaction between a mobile device and a verification server when the verification server generates a challenge strategy according to another specific example. As shown in FIG. 4, the signaling interaction includes the following steps.

A first step, the mobile device generates a dynamic password represented with n lines of numeral strings, rather than generates the dynamic password represented with 6 bits of numerals, e.g., 1) 298570
2) 985570
3) 255378
4) 018373.

A second step, the verification server generates a challenge strategy, and prompts the user to input a numeral string of the $x^{th}$ line, e.g., "please input the numeral string of the $2^{nd}$ line of the dynamic password.

A third step, the user inputs the numeral string of the $x^{th}$ line according to the prompt of the verification server. For example, suppose the prompt in the second step is "please input the numeral string of the $2^{nd}$ line of the dynamic password", the user should input "985570".

A fourth step, the verification server verifies whether the dynamic password inputted by the user is correct according to the challenge strategy and by using the method provided by the first example.

A fifth step, a verification result is displayed.

Figure 5:
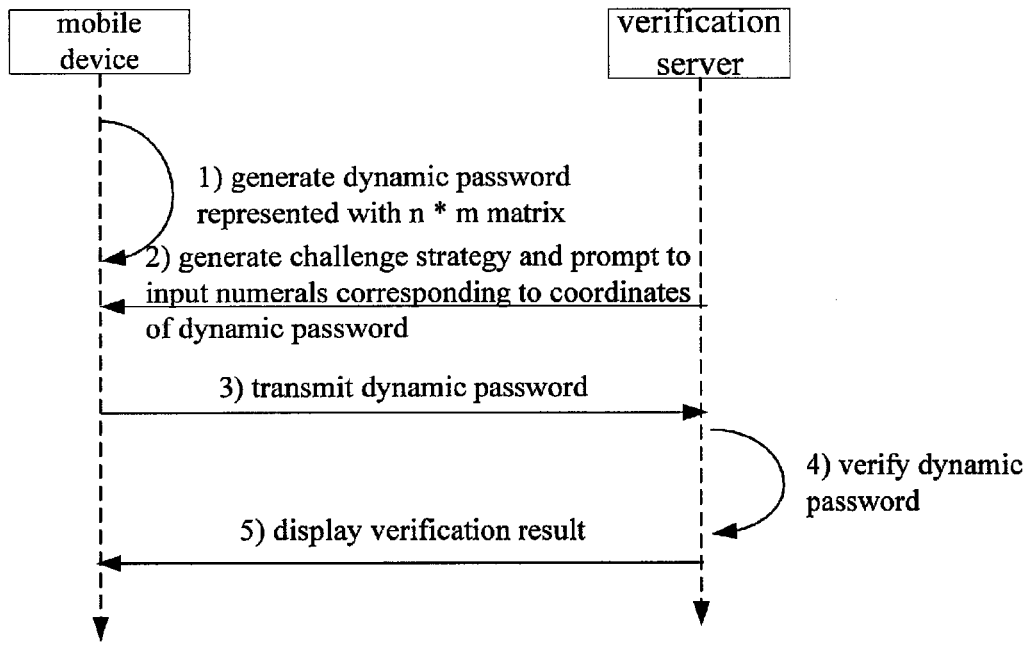
FIG. 5 is a schematic diagram illustrating signaling interaction between a mobile device and a verification server when the verification server generates a challenge strategy according to another specific example.

FIG. 5 is a schematic diagram illustrating signaling interaction between a mobile device and a verification server when the verification server generates a challenge strategy according to another specific example. As shown in FIG. 5, the signaling interaction includes the following steps.

A first step, the mobile device generates a dynamic password represented with an n*m matrix according to a token seed and a current time, e.g., generates a dynamic password represented with a 4*4 matrix as follows:

|   | 1  | 2  | 3  | 4  |
|---|----|----|----|----|
| A | 12 | 90 | 85 | 70 |
| B | 95 | 15 | 25 | 29 |
| C | 52 | 22 | 89 | 78 |
| D | 01 | 08 | 37 | 32.|

A second step, the verification server generates a challenge strategy, and prompts a user to input numeral strings corresponding to some coordinates, e.g., "please input numerals corresponding to A2, C3 and D1".

A third step, the user inputs the numerals corresponding to the coordinates according to the prompt of the verification server. For example, the user inputs "90 89 01" according to the prompt in the second step.

A fourth step, the verification server verifies whether the dynamic password inputted by the user is correct according to the challenge strategy and by using the method provided by the first example.

A fifth step, a verification result is displayed.

By using the challenge strategy, the security of the dynamic password may be further improved.

By the technical solution provided by the above examples, the dynamic password may be verified, the security of identity verification may be improved, and the method can be easy to use. Moreover, since the initial code, the ACK code and the dynamic password are transmitted to the verification server through a web page, no message exchange is needed between the mobile device and the verification server, and the user does not need to pay for additional flux, so as to decrease the burden of the user and verification costs.

Figure 6:
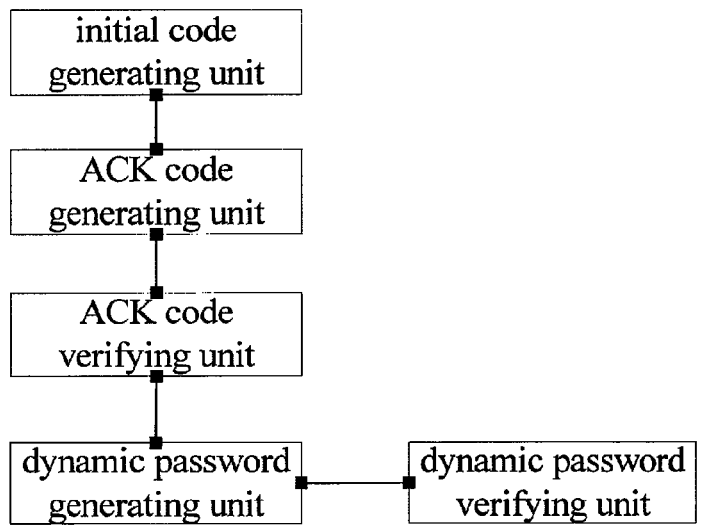
FIG. 6 is a schematic diagram illustrating the structure of a device for verifying a dynamic password according to a second example of the present invention.

A second example provides a device for verifying a dynamic password. FIG. 6 is a schematic diagram illustrating the structure of the device for verifying a dynamic password. The device includes an initial code generating unit, a dynamic password generating unit and a dynamic password verifying unit.

The initial code generating unit is configured in a mobile device, and is configured to generate an initial code according to token software, where the initial code is transmitted to a verification server through a web page. The method for generating the initial code and transmitting the initial code to the verification server may refer to that described in the first example.

The dynamic password generating unit is configured in the mobile device, and is configured to generate a current dynamic password of the mobile device by using a Diffie-Hellman algorithm after the initial code passes verification. The current dynamic password may be transmitted to the verification through a web page. The method of generating the dynamic password and transmitting the dynamic password to the verification server may refer to that described in the first example.

The dynamic password verifying unit is configured in the verification server, and is configured to generate a dynamic password of the verification server according to the received initial code and by using the same DH algorithm as that used by the dynamic password generating unit, and compare the dynamic password of the verification server with the dynamic password of the mobile device, and verify whether the dynamic password of the mobile device generated by the dynamic password generating unit is correct.

In addition, the above device further includes an ACK code generating unit and an ACK code verifying unit.

The ACK code generating unit is configured in the verification server, and is configured to perform preset algorithm processing for the initial code received by the verification server, and generates an ACK code. The method for generating the ACK code may refer to that described in the first example.

The ACK code verifying unit is configured in the mobile device, and is configured to obtain the ACK code generated by the ACK code generating unit, and generate an ACK of the mobile device according to the initial code generated by the initial code generating unit and by using the same algorithm as that used by the ACK code generating unit, and compare the ACK code generated by the ACK code verifying unit with the ACK code generated by the ACK code generating unit, and verify whether the initial code received by the verification server is correct. The method for verifying the dynamic password may refer to that described in the first example.

It should be noted that, the units included in the above device are differentiated according to logic functions, but are not limited to the above structure as long as the logic functions can be realized. In addition, the respective names of the units are only used for differentiating from each other, and are not used to limit the protection scope of the present invention.

Those skilled in the art can understand that all or part of steps in the method provided by the first example can be implemented by instructing related hardware by a program, the program may be stored in a readable memory of a computer. The memory includes a ROM/RAM, a disk, a Compact Disc (CD) and so on.

To sum up, the technical solution provided by the examples of the present invention can improve the security of identity verification and can be easy to use. Moreover, by the technical solution, no message exchange is needed between the mobile device and the verification server, and the user does not need to pay for additional flux, so as to decrease the burden of the user and verification costs.

The foregoing is only preferred embodiments of the present invention, and the protection scope of the present invention is not limited to this. Any improvement and replacement which can be made in the technical scope disclosed by the present invention by those skilled in the art should be covered in the protection scope of the invention. And thus, the protection scope of the present invention should be defined by the claims.

What is claimed is:

1. A method for verifying a dynamic password, comprising:
    generating, by a mobile device, an initial code according to token software, and transmitting the initial code to a verification server through a web page;
    after the initial code passes verification, generating, by the mobile device, a Diffie-Hellman (DH) key of the mobile device according to a Diffie-Hellman private key of the mobile device and by using a Diffie-Hellman algorithm, generating a token seed according to the Diffie-Hellman key of the mobile device and by using a Hash algorithm, generating a current dynamic password by performing preset algorithm processing for the token seed and current time, and transmitting the current dynamic password to the verification server through a web page;
    generating, by the verification server, a dynamic password of the verification server according to the received initial code and by using the same Diffie-Hellman algorithm as that used by the mobile device; and
    comparing, by the verification server, the dynamic password of the verification server with the dynamic password generated by the mobile device, and verifying whether the dynamic password generated by the mobile device is correct.

2. The method of claim 1, wherein the procedure of verifying the initial code comprises:
    performing, by the verification server, preset algorithm processing for the received initial code, and generating an ACK code;
    obtaining, by the mobile device, the ACK code generated by the verification server, and generating an ACK code of the mobile device according to the initial code and by using the same algorithm as that used by the verification server; and
    comparing, by the mobile device, the ACK code generated by the mobile device with the ACK code generated by the verification server, and verify whether the initial code is correct.

3. The method of claim 2, wherein generating, by the verification server, the ACK code comprises one of:
    generating, by the verification server, a random numeral string, generating a check code by performing the preset algorithm processing for the random numeral string and the received initial code, and generating the ACK code by combining the check code and the random numeral string; and generating, by the verification server, a random DH private key, and generating a DH public key according to the DH private key and by using the DH algorithm, generating a check code by performing the present algorithm processing for the DH public key and the received initial code, and generating the ACK code by combining the check code and the DH public key.

4. The method of claim 2, wherein performing, by the verification server, preset algorithm processing for the received initial code and generating an ACK code comprises:

generating, by the verification server, a random numeral string, and generating a check code by performing the preset algorithm processing for the random numeral string and the received initial code; and generating the ACK code by combining the check code and the random numeral string.

5. The method of claim 2, wherein performing, by the verification server, preset algorithm processing for the received initial code and generating an ACK code comprises:

generating, by the verification server, a random Diffie-Hellman private key, and generating a Diffie-Hellman public key according to the Diffie-Hellman private and by using the Diffie-Hellman algorithm;

generating a check code by performing the preset algorithm processing for the Diffie-Hellman public key and the received initial code; and generating the ACK code by combining the check code and the Diffie-Hellman public key.

6. The method of claim 1, wherein transmitting the initial code to the verification server through a web page comprises:

performing multi-band encoding for the initial code, and transmitting the initial code to the verification server through the web page.

7. The method of claim 6, wherein the multi-band encoding comprises 32-band encoding or n-band encoding, wherein n is an integer larger than 32.

8. The method of claim 1, wherein generating, by the verification server, the dynamic password of the verification server according to the received initial code and by using a same Diffie-Hellman algorithm as that used by the mobile device comprises:

obtaining, by the verification server, a Diffie-Hellman public key of the mobile device by parsing the received initial code;

generating the Diffie-Hellman key of the mobile device according to the obtained Diffie-Hellman public key, and generating the dynamic password of the verification server according to the Diffie-Hellman key and by using the same Diffie-Hellman algorithm as that used by the mobile device.

9. The method of claim 8, wherein generating the dynamic password of the verification server according to the Diffie-Hellman key and by using the same Diffie-Hellman algorithm as that used by the mobile device comprises:

generating the token seed according to the Diffie-Hellman key and by using the Hash algorithm, and storing the token seed; and generating the dynamic password of the verification server according to the token seed and by using the same Diffie-Hellman algorithm as that used by the mobile device in a procedure of generating the dynamic password every time.

10. The method of claim 1, in the procedure of verifying whether the dynamic password generated by the mobile device is correct, further comprising:

determining that the dynamic password generated by the mobile device is correct if the dynamic password generated by the verification server is the same as the dynamic password generated by the mobile device in a defined time difference.

11. The method of claim 1, wherein generating, by the mobile device, the current dynamic password by using a Diffie-Hellman algorithm and transmitting the current dynamic password to the verification server through a web page comprises one of:

generating, by the mobile device, the current dynamic password represented with a string of numerals by using the Diffie-Hellman algorithm; generating, by the verification server, a challenge strategy, and prompting the mobile device to input specific numerals of the current dynamic password; transmitting, by the mobile device, the specific numerals of the current dynamic password to the verification server through the web page according to the challenge strategy;

generating, by the mobile device, the current dynamic password represented with multiple strings of numerals by using the Diffie-Hellman algorithm; generating, by the verification server, a challenge strategy, and prompting the mobile device to input a string of numerals of the current dynamic password; transmitting, by the mobile device, the string of numerals of the current dynamic password to the verification server through the web page according to the challenge strategy; and generating, by the mobile device, the current dynamic password represented with a numeral matrix by using the Diffie-Hellman algorithm; generating, by the verification server, a challenge strategy, and prompting the mobile device to input a numeral string corresponding to a matrix coordinate of the current dynamic password; transmitting, by the mobile device, the numeral string corresponding to the matrix coordinate of the current dynamic password to the verification server through the web page according to the challenge strategy.

12. A device for verifying a dynamic password, comprising:

an initial code generating unit, configured in a mobile device, and configured to generate an initial code according to token software, wherein the initial code is transmitted to a verification server through a web page;

a dynamic password generating unit, configured in the mobile device, and configured to, after the initial code passes verification, generate a Diffie-Hellman (DH) key of the mobile device according to a Diffie-Hellman private key of the mobile device and by using a Diffie-Hellman algorithm, generate a token seed according to the Diffie-Hellman key of the mobile device and using a Hash algorithm, and generate a current dynamic password by performing preset algorithm processing for the token seed and current time, wherein the current dynamic password is transmitted to the verification through a web page; and a dynamic password verifying unit, configured in the verification server, and configured to generate a dynamic password of the verification server according to the received initial code and by using a same DH algorithm as that used by the dynamic password generating unit, compare the dynamic password of the verification server with the dynamic password of the mobile device, and verify whether the dynamic password generated by the dynamic password generating unit is correct.

13. The device of claim 12, further comprising:
an ACK code generating unit, configured in the verification server, and configured to perform preset algorithm processing for the initial code received by the verification server, and generate an ACK code; and
an ACK code verifying unit, configured in the mobile device, and configured to obtain the ACK code generated by the ACK code generating unit, and generate an ACK of the mobile device according to the initial code generated by the initial code generating unit and by using a same algorithm as that used by the ACK code generating unit, compare the ACK code generated by the ACK code verifying unit with the ACK code generated by the ACK code generating unit, and verify whether the initial code received by the verification server is correct.

14. The device of claim 12, wherein the dynamic password verifying unit configured to obtain a Diffie-Hellman public key of the mobile device by parsing the received initial code, generate the Diffie-Hellman key of the mobile device according to the obtained Diffie-Hellman public key, and generate the dynamic password of the verification server according to the Diffie-Hellman key and by using the same Diffie-Hellman algorithm as that used by the mobile device.

15. The device of claim 14, wherein the dynamic password verifying unit configured to generate the token seed according to the Diffie-Hellman key and by using the Hash algorithm, store the token seed, and generate the dynamic password of the verification server according to the token seed and by using the same Diffie-Hellman algorithm as that used by the mobile device in a procedure of generating the dynamic password every time.

16. The device of claim 12, wherein the dynamic password verifying unit is configured to determine that the dynamic password generated by the mobile device is correct if the dynamic password generated by the verification server is the same as the dynamic password generated by the mobile device in a defined time difference.

* * * * *